US012617278B2

(12) United States Patent
Jang et al.

(10) Patent No.: US 12,617,278 B2
(45) Date of Patent: May 5, 2026

(54) DISPLAY DEVICE AND VEHICLE EQUIPPED WITH THE DISPLAY DEVICE

(71) Applicant: HYUNDAI MOBIS CO., LTD., Seoul (KR)

(72) Inventors: Kil Pyung Jang, Seoul (KR); Shin Yeong Kim, Cheongju-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 107 days.

(21) Appl. No.: 18/778,343

(22) Filed: Jul. 19, 2024

(65) Prior Publication Data

US 2025/0074191 A1 Mar. 6, 2025

(30) Foreign Application Priority Data

Sep. 6, 2023 (KR) ........................ 10-2023-0118371

(51) Int. Cl.
*B60K 35/22* (2024.01)

(52) U.S. Cl.
CPC ........ *B60K 35/22* (2024.01); *B60K 2360/682* (2024.01)

(58) Field of Classification Search
CPC .............. B60K 35/22; B60K 2360/682; B60K 2360/92; B60K 35/53; B60K 35/223; B60K 35/55; B60K 35/00; B60K 2360/48; B60K 2360/691; B60R 11/0235; B60R 2011/0092; G09F 9/301; G09F 9/33; G09F 9/335; G09F 21/048; B60Y 2400/702; B60Y 2400/92
USPC ........................................................ 348/837
See application file for complete search history.

(56) References Cited

U.S. PATENT DOCUMENTS

| | | | | |
|---|---|---|---|---|
| 12,456,395 B2 * | 10/2025 | Jang | ..................... | G06F 1/1652 |
| 2005/0040962 A1 * | 2/2005 | Funkhouser | .......... | G06F 1/1601 |
| | | | | 340/815.4 |
| 2005/0174366 A1 * | 8/2005 | Wu | ....................... | G06F 1/1601 |
| | | | | 345/905 |
| 2008/0198540 A1 * | 8/2008 | Bemelmans | ........ | H04M 1/0202 |
| | | | | 361/679.06 |
| 2013/0036638 A1 * | 2/2013 | Kwack | ..................... | G09G 3/20 |
| | | | | 235/494 |
| 2013/0058063 A1 * | 3/2013 | O'Brien | ................ | G06F 1/1624 |
| | | | | 361/807 |
| 2013/0127917 A1 * | 5/2013 | Kwack | .................. | G06F 1/1652 |
| | | | | 345/660 |
| 2014/0216329 A1 * | 8/2014 | Masuda | ............... | B60K 35/223 |
| | | | | 116/28 R |
| 2016/0320871 A1 * | 11/2016 | Li | .......................... | G06F 1/1652 |
| 2017/0023978 A1 * | 1/2017 | Cho | ..................... | G06F 1/1652 |
| 2017/0031387 A1 * | 2/2017 | Kim | ..................... | G06F 1/1652 |
| 2017/0140737 A1 * | 5/2017 | Cho | ..................... | G09G 3/035 |
| 2018/0376603 A1 * | 12/2018 | Lee | ..................... | H05K 5/0221 |

(Continued)

*Primary Examiner* — Tung T Vo
(74) *Attorney, Agent, or Firm* — Morgan Lewis & Bockius LLP

(57) ABSTRACT

The present disclosure relates a display device and a vehicle equipped with the display device. The display device may include a display driver moving a display, a display winder winding and unwinding the display according to the movement of the display, and a display support unit supporting the display. The display support unit may include a housing supporting the display, a door provided in the housing and movable to enable the display to move into and out of the housing, and a door driver moving the door.

7 Claims, 18 Drawing Sheets

(56)       References Cited

U.S. PATENT DOCUMENTS

| | | | | |
|---|---|---|---|---|
| 2019/0371214 | A1* | 12/2019 | Kim | G09F 9/301 |
| 2020/0077194 | A1* | 3/2020 | Kim | H04R 9/025 |
| 2020/0331348 | A1* | 10/2020 | Feng | B60K 35/53 |
| 2021/0204426 | A1* | 7/2021 | Rha | G06F 1/1652 |
| 2022/0139275 | A1* | 5/2022 | Pyo | G06F 1/1652 |
| | | | | 361/679.01 |
| 2023/0109437 | A1* | 4/2023 | Pyo | H05K 5/0217 |
| | | | | 361/807 |
| 2023/0132282 | A1* | 4/2023 | Kim | G09F 9/301 |
| | | | | 361/679.01 |
| 2023/0217610 | A1* | 7/2023 | Lee | G06F 1/1652 |
| | | | | 361/807 |
| 2023/0356669 | A1* | 11/2023 | Jang | B60R 11/0229 |
| 2024/0042945 | A1* | 2/2024 | Jang | B60K 35/81 |
| 2024/0042946 | A1* | 2/2024 | Jang | B60K 35/00 |
| 2024/0059228 | A1* | 2/2024 | Jang | B60R 11/0235 |
| 2024/0103659 | A1* | 3/2024 | Kim | G06F 3/041 |
| 2024/0149681 | A1* | 5/2024 | Ive | B60K 35/50 |
| 2025/0337977 | A1* | 10/2025 | Lee | H04N 5/64 |

* cited by examiner

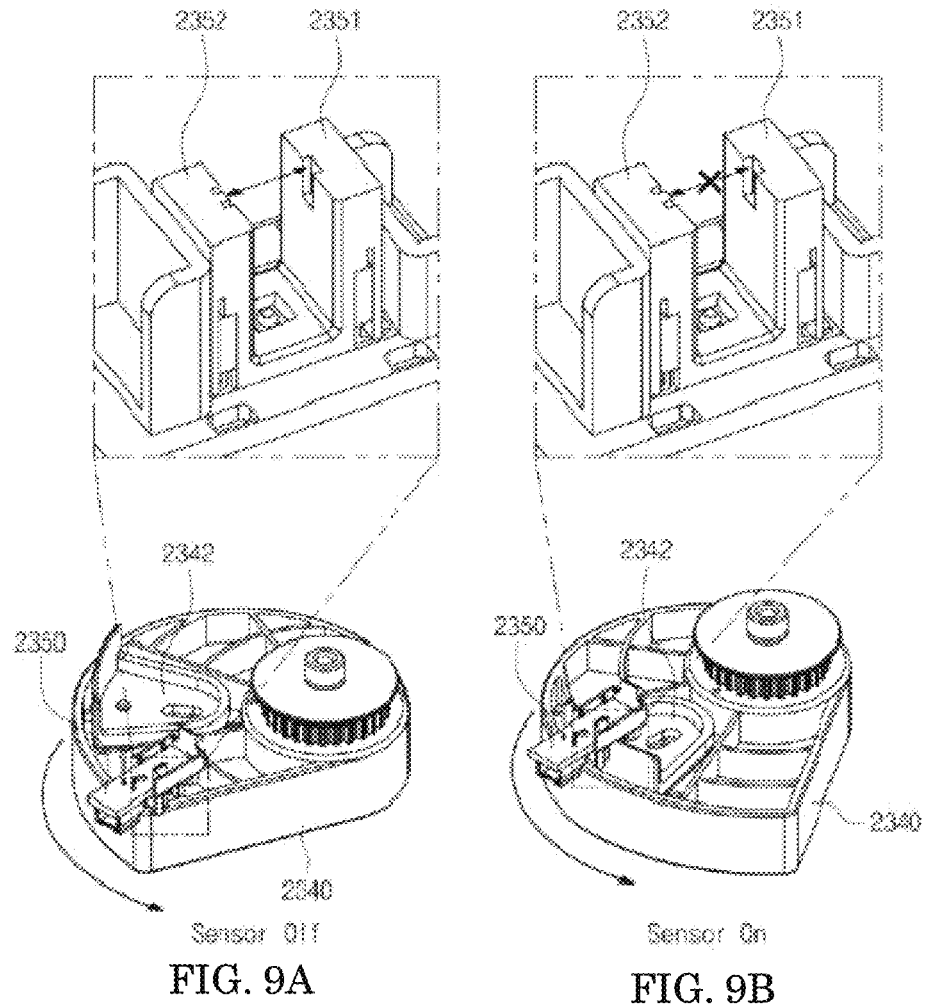
FIG. 9A                    FIG. 9B

DISPLAY DEVICE AND VEHICLE EQUIPPED WITH THE DISPLAY DEVICE

CROSS-REFERENCE TO RELATED APPLICATION(S)

This application is based on and claims priority under 35 U.S.C. § 119 to Korean Patent Application No. 10-2023-0118371, which was filed in the Korean Intellectual Property Office on Sep. 6, 2023, the entire disclosure of which is incorporated herein by reference.

BACKGROUND

1. Field

The present embodiments relate to a flexible display device for a vehicle, which is applicable to vehicles in all fields, a method of controlling the display device, and a vehicle equipped with the display device, and more particularly, to an apparatus and method for supporting a device capable of retracting or extending (retracting/extending) a flexible display which is bendable or warpable.

2. Description of Related Art

A center fascia display of a vehicle may display various visual information about the vehicle. Such a display device may also be installed on a dashboard of a vehicle disposed in front of a driver's seat and a front passenger seat, and provides various convenience information such as navigation, vehicle management and operation, Internet, and entertainment.

In this regard, there is a movable display device, and the movable display device is capable of moving up and down or left and right relative to a dashboard. As the display moves along a guide, a driver and a passenger may selectively use the display. In the case of a display in the form of a pop-up, the display may be stored and then extended and used when necessary.

Since an installation position of a fixed display is fixed, the use of space in a vehicle is limited, and as a display size increases, the forward visibility decreases. A pop-up style movable display requires a separate accommodation space for the display, and as the size of the display increases, the size of the accommodation space also increases, limiting the utilization of space in the vehicle. In addition, since an entire screen is operated in an LCD screen display, inefficiency in that all power is used regardless of a degree of exposure of the display remains.

Therefore, it is required to develop a display device having a form and structure for multiplying advantages while minimizing these disadvantages.

SUMMARY

An object of the embodiments of the disclosure is to provide a display device for reducing the size of an accommodation space of a display used in a vehicle.

An object of the disclosure is to provide a display device for efficiently retracting or extending a display used in a vehicle from an accommodation space.

An object of embodiments of the disclosure is to provide a display device for controlling a degree of exposure of a display according to a purpose of using a display.

In addition, an object of embodiments of the disclosure is to provide a display device for saving power for outputting a display image.

It will be appreciated by one of ordinary skill in the art that the objects that could be achieved with the disclosure are not limited to what has been particularly described hereinabove and the above and other objects that the disclosure could achieve will be more clearly understood from the following detailed description.

To achieve the above objects, a display device according to embodiments may include a display driver moving a display, a display winder winding and unwinding the display according to the movement of the display, and a display support unit supporting the display. The display support unit may include a housing supporting the display, a door provided in the housing and movable to enable the display to move into and out of the housing, and a door driver moving the door.

According to embodiments, the door driver may include a second motor providing a driving force, and a cam receiving the driving force and rotatable by the driving force, and the door may be linearly movable by rotation of the cam.

According to embodiments, the door driver may further include a blocker fixed to the cam and upon rotation of the cam, rotating together with the cam, and a sensor including a light emitter emitting light and a light receiver receiving the light, and on/off of the sensor may be determined according to whether the light is blocked by the blocker.

According to embodiments, the cam may include a cam pulley connected to the second motor by a second timing belt and being a rotation axis of the cam. The cam may include a first surface formed in a straight line and a second surface formed in a curve with a decreasing curvature, and the cam pulley may be formed at a position where the first surface and the second surface meet.

According to embodiments, the door may be in surface-contact with the second surface of the cam.

According to embodiments, the door driver may include a slide unit to enable the door to move, and the slide unit may include a connection fixture fixing the door thereto and moving together with the door, a first slide fixed to the connection fixture, a first bracket fixed to the housing, and a second slide fixed to the first bracket and allowing the first slide to be movable therein.

According to embodiments, the door driver may include a spring providing an elastic force in a direction of movement of the door.

According to embodiments, the display driver may include a first motor providing a driving force, a worm gear unit connected to the first motor and having a rotation axis parallel to the first motor, and a worm wheel unit connected to the worm gear unit and having a rotation axis perpendicular to the first motor. The display winder may include a cylindrical rotation drum rotating around a horizontal rotation axis and capable of winding the display around an outer circumferential surface thereof, and the rotation axis of the worm wheel unit may be the same as the rotation axis of the rotation drum to move the display by rotation of the first motor.

To achieve the above objects, a vehicle according to embodiments may include a vehicle body and a display device provided in the vehicle body. The display device may include a display driver moving a display, a display winder winding and unwinding the display according to the movement of the display, and a display support unit supporting the display, and the display support unit may include a housing supporting the display, a door provided in the housing and movable to enable the display to move into and out of the housing, and a door driver moving the door.

According to embodiments, the housing may be an instrument panel (IP) of the vehicle body.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates an extended display in a display device according to embodiments;

FIG. 5 is an exploded view illustrating a display support unit in a display device according to embodiments;

FIG. 6 is a top view illustrating a door driver in a display device according to embodiments;

FIG. 7 is a perspective view illustrating a door driver in a display device according to embodiments;

FIGS. 9A and 9B illustrate the operating principle of a sensor in a door driver of a display device according to embodiments;

DETAILED DESCRIPTION

Figure 1:
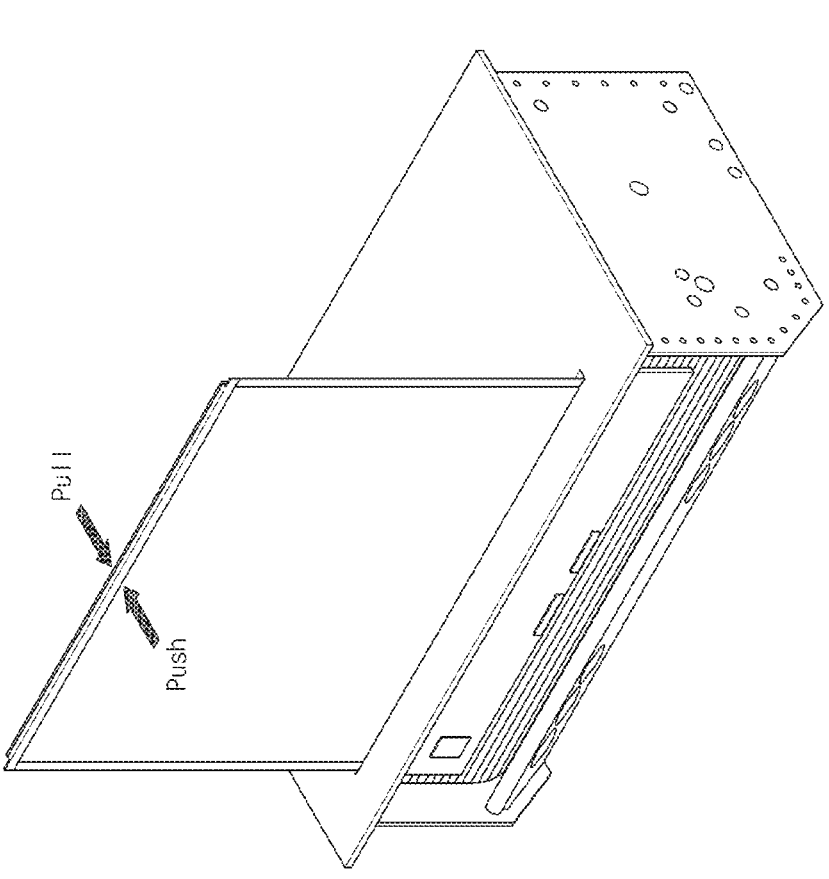
FIG. 1 illustrates a conventional display device.

Embodiments of the disclosure will be described below in detail with reference to the attached drawings. Like reference numerals denote the same components throughout the drawings regardless of drawing numbers, and a redundant description of the components will be avoided.

The term "module" and "unit" used to name a component are given or used interchangeably in consideration of only the ease of description, and do not have meanings or roles that are distinguished from each other. Lest it should obscure the subject matter of the disclosure, a detailed description of a generally known function or structure of the disclosure will be avoided.

The attached drawings are provided only to help the understanding of the embodiments of the disclosure, not intended to limit the technical features set forth herein, and it should be appreciated that the disclosure encompasses all changes, equivalents, or replacements within the scope and spirit of the disclosure.

Ordinal numbers such as $1^{st}$, $2^{nd}$, first, and second may be used to describe various elements, but the elements are not limited by the terms. The above terms are used only for the purpose of distinguishing one component from another component.

When it is said that a component is "connected" or "coupled" to another component, this may mean that the component is directly connected or coupled to the other component, but a third component may exist in the middle. On the other hand, when it is said that a component is "directly connected" or "directly coupled" to another component, this may mean that there is no other component between the two components.

Unless otherwise dictated contextually, a singular expression includes plural referents.

The term "include" or "have" as used herein is intended to designate the presence of a feature, a number, a step, an operation, a component, a part, or a combination thereof, not excluding the possibility of the presence or addition of one or more other features, numbers, steps, operations, components, parts, or combinations thereof.

FIG. 1 illustrates a conventional display device.

As illustrated in FIG. 1, rollable/slidable display devices currently being developed by various competitors suffer from smaller rigidity than fixed display devices in view of their designs or mounting structures.

Particularly, when a force such as a push load or pull load is applied to a display which has been fully extended, the display is vulnerable to breakage because a support structure for the display is located only at the bottom of the display and thus weak.

In this regard, embodiments are intended to provide a display device that supports a display and provides additional rigidity to the display.

Figure 2:
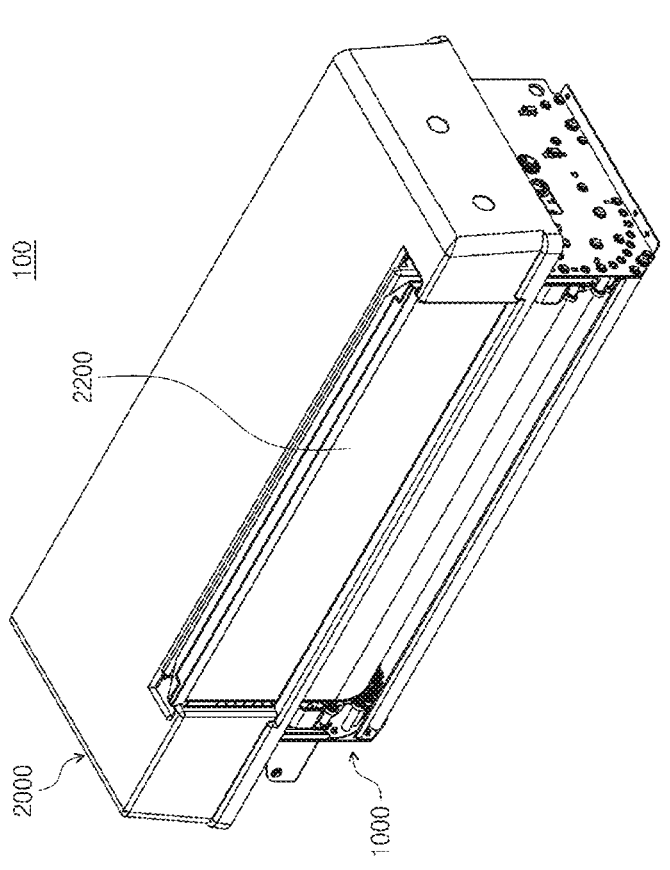
FIG. 2 illustrates a retracted display in a display device according to embodiments.
Figure 3:
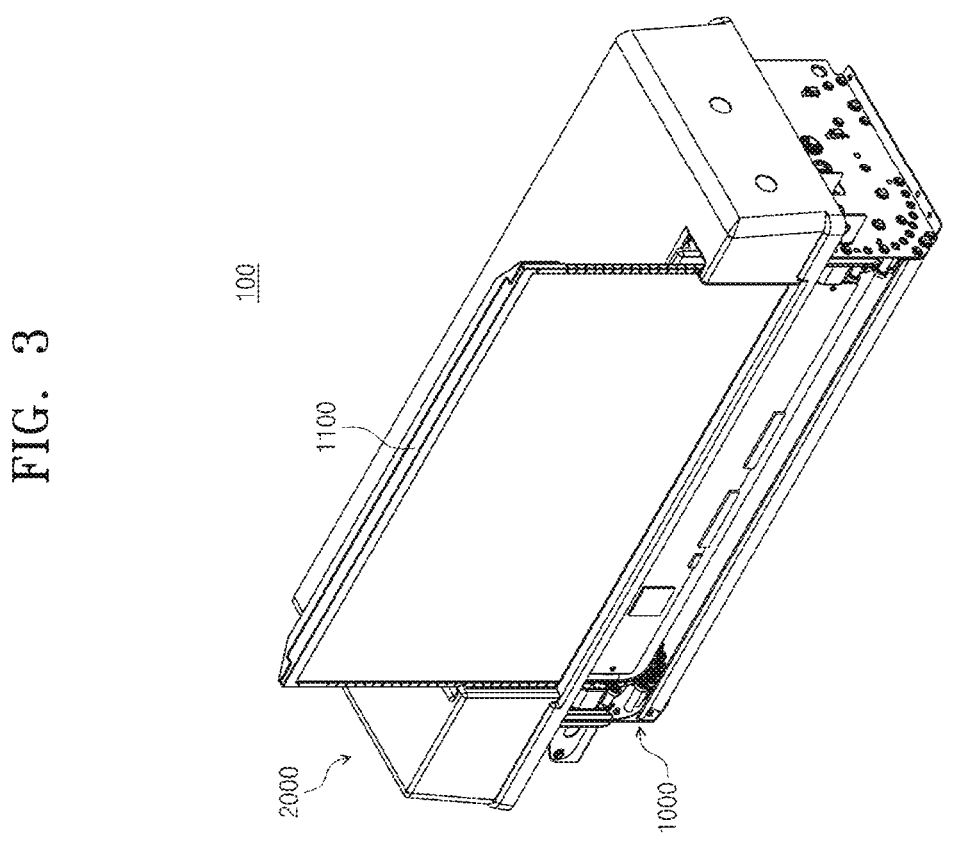

FIG. 2 illustrates a retracted display in a display device according to embodiments. FIG. 3 illustrates an extended display in a display device according to embodiments.

As illustrated in FIGS. 2 and 3, a display device 100 according to embodiments may include a display unit 1000 that drives and winds/unwinds a display 1100, and a display support unit 2000 that supports the display 1100. The display support unit 2000 is preferably located on top of the display unit 1000.

That is, the display device 100 according to embodiments has the effect that the display support unit 2000 is capable of supporting extension of the display 1100 without interfering with it, so that the display 1100 is not easily broken by an external force.

Figure 4:
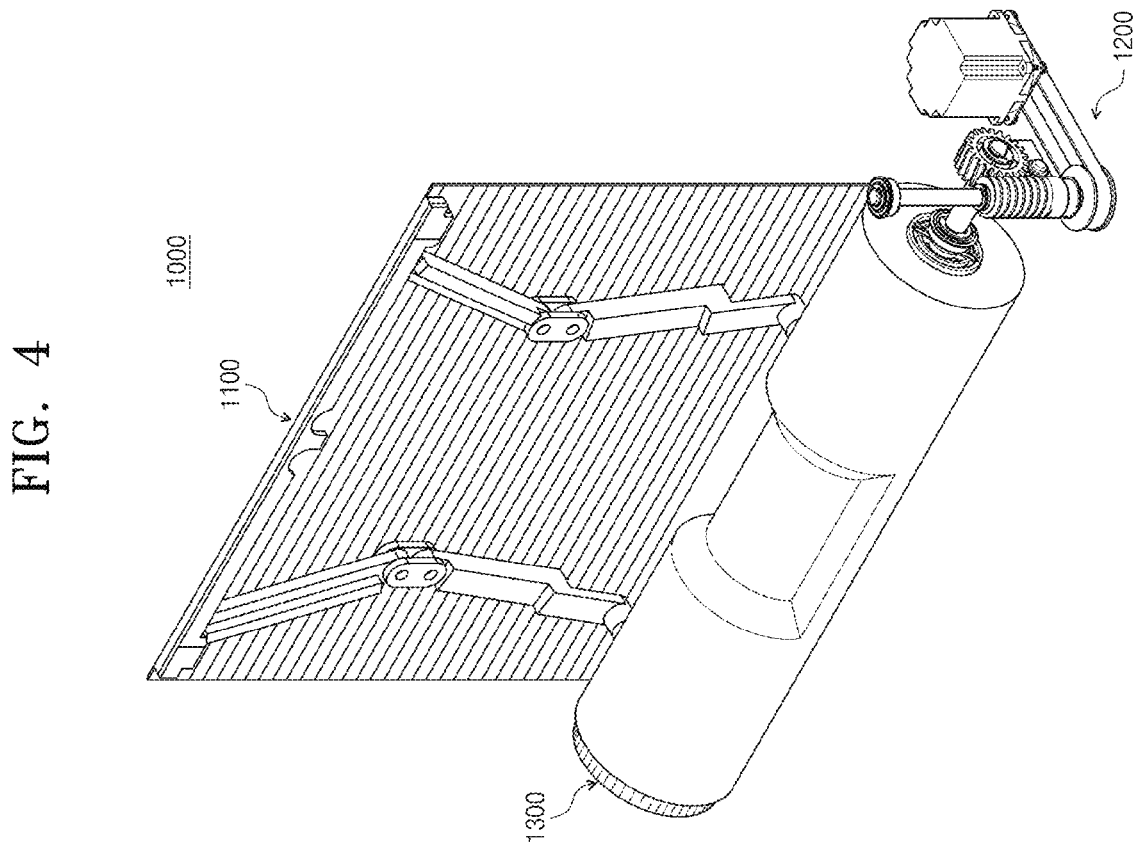
FIG. 4 illustrates a display unit in a display device according to embodiments.

FIG. 4 illustrates a display unit in a display device according to embodiments.

The display unit of FIG. 4 corresponds to the display unit illustrated in FIGS. 2 and 3.

As illustrated in FIG. 4, the display unit 1000 may include the display 1100, a display driver 1200, and a display winder 1300. A detailed description will be given of the display driver 1200 and the display winder 1300 with reference to FIG. 15.

The display 1100 may be a flexible or rollable display 1100. The display 1100 may be a plastic organic light emitting diode (POLED) display. A POLED is an organic light emitting diode (OLED) with a polyimide (PI) substrate being a type of plastic, which may implement a curved surface.

The display 1100 may be bendable, and a radius of curvature at which the display 1100 is bent may be at least 10 mm or larger. Preferably, the radius of curvature at which the display 1100 is bent may be at least 30 mm or larger. The display 1100 may include a light emitting diode (LED) (OLED, active matrix OLED (AMOLED), or passive matrix OLED (PMOLED)). The width and height of the display 1100 may be designed appropriately by those skilled in the art.

Figure 5:
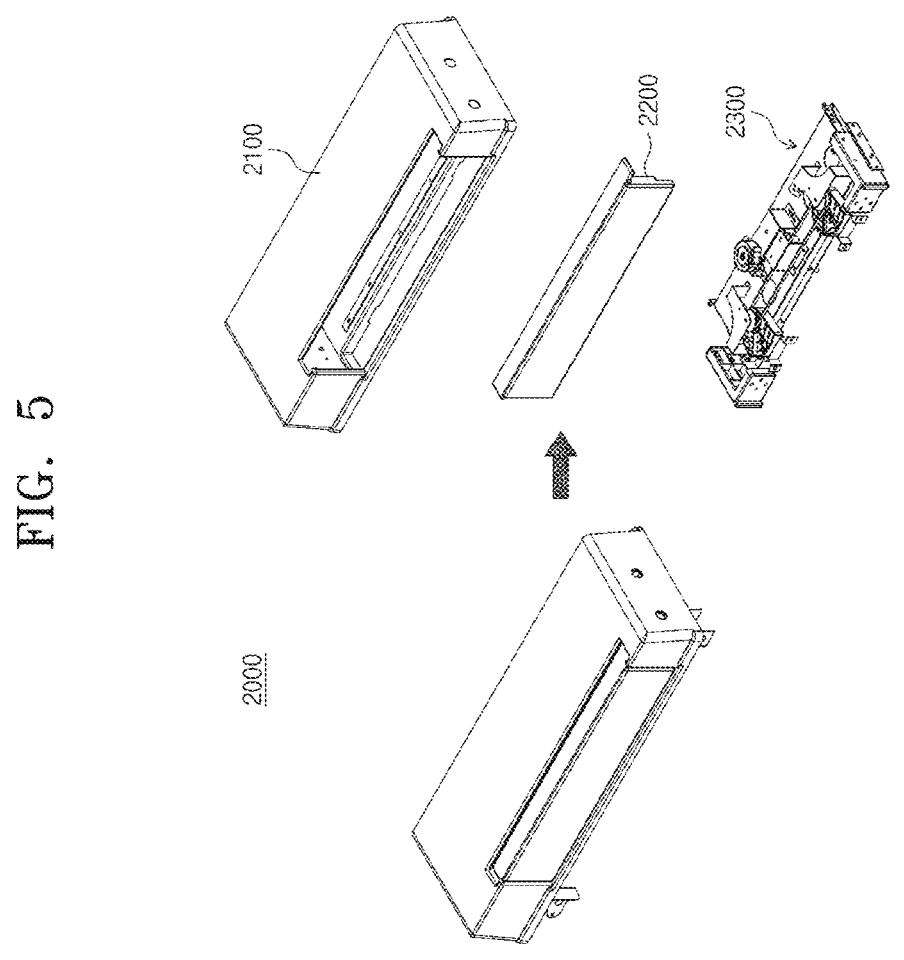

FIG. 5 is an exploded view illustrating a display support unit in a display device according to embodiments.

The display support unit of FIG. 5 corresponds to the display support unit illustrated in FIGS. 2 and 3.

Referring to FIG. 5, the display support unit 2000 may include a housing 2100, a door 2200, and a door driver 2300.

The housing 2100 may be provided with the door 2200 outside of it and the door driver 2300 inside of it, and include an opening to enable extension or retraction of the display 1100. The housing 2100 may have a certain height such that when the display 1100 is fully or partially extended, the bottoms of sides and the bottom of the display 1100 may be supported. The height may be small in consideration of design or large in consideration of the safety of the display.

Further, the housing 2100 may be an instrument panel (IP) of a vehicle. In other words, the IP itself may be formed as the housing 2100, with the door driver 2300 therein and the opening through which the display 1100 is extended or retracted, rather than the housing 2100 is added. Accordingly, because no additional configuration is added, a variety of designs become available.

The door 2200 is provided in the outside of the housing 2100, and particularly, movable to enable the display 1100 to be extended from or retracted into the housing 2100. Particularly, the door 2200 is linearly movable in forward and backward directions of the housing 2100.

For example, when the display 1100 is retracted, that is, when the display 1100 is not in use, the door 2200 linearly moves in the forward direction of the housing 2100 to be positioned exposed to the outside of the housing 2100 (see FIG. 2). When the display 1100 is retracted, that is, when the display 1100 is in use, the door 2200 linearly moves in the backward (inward) direction of the housing 2100, and the door 2200 is positioned not to be exposed to the outside of the housing 2100 due to the extension of the display 1100 (see FIG. 3).

The door driver 2300 may move the door 2200 to allow linear movement of the door 2200. That is, the door driver 2300 may be located inside the housing 2100 and move the position of the door 2200 according to retraction/extension of the display 1100. The door driver 2300 will be described in more detail with reference to FIGS. 6 and 7.

Figure 6:
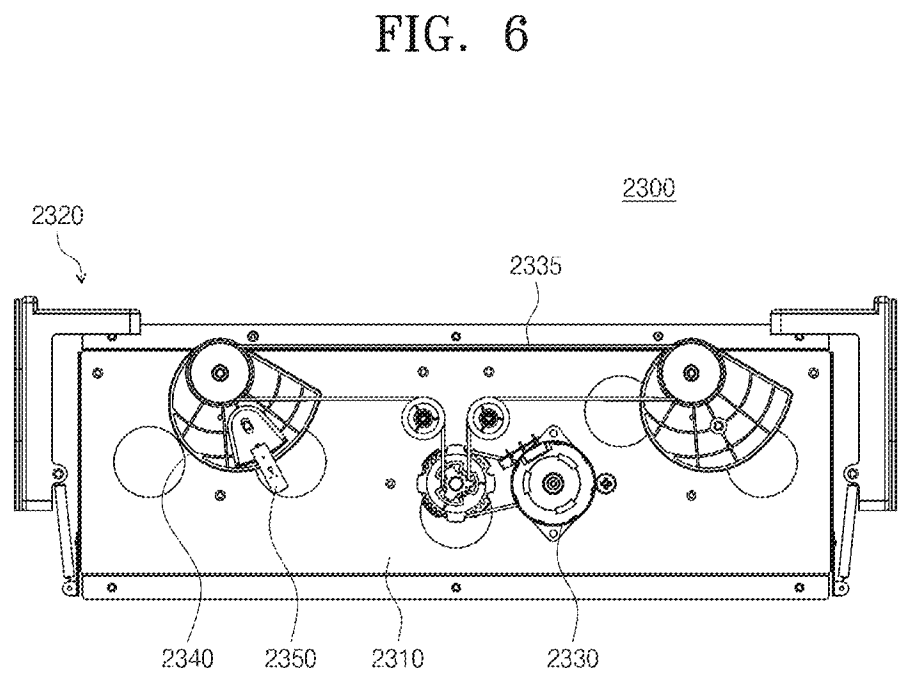
Figure 7:
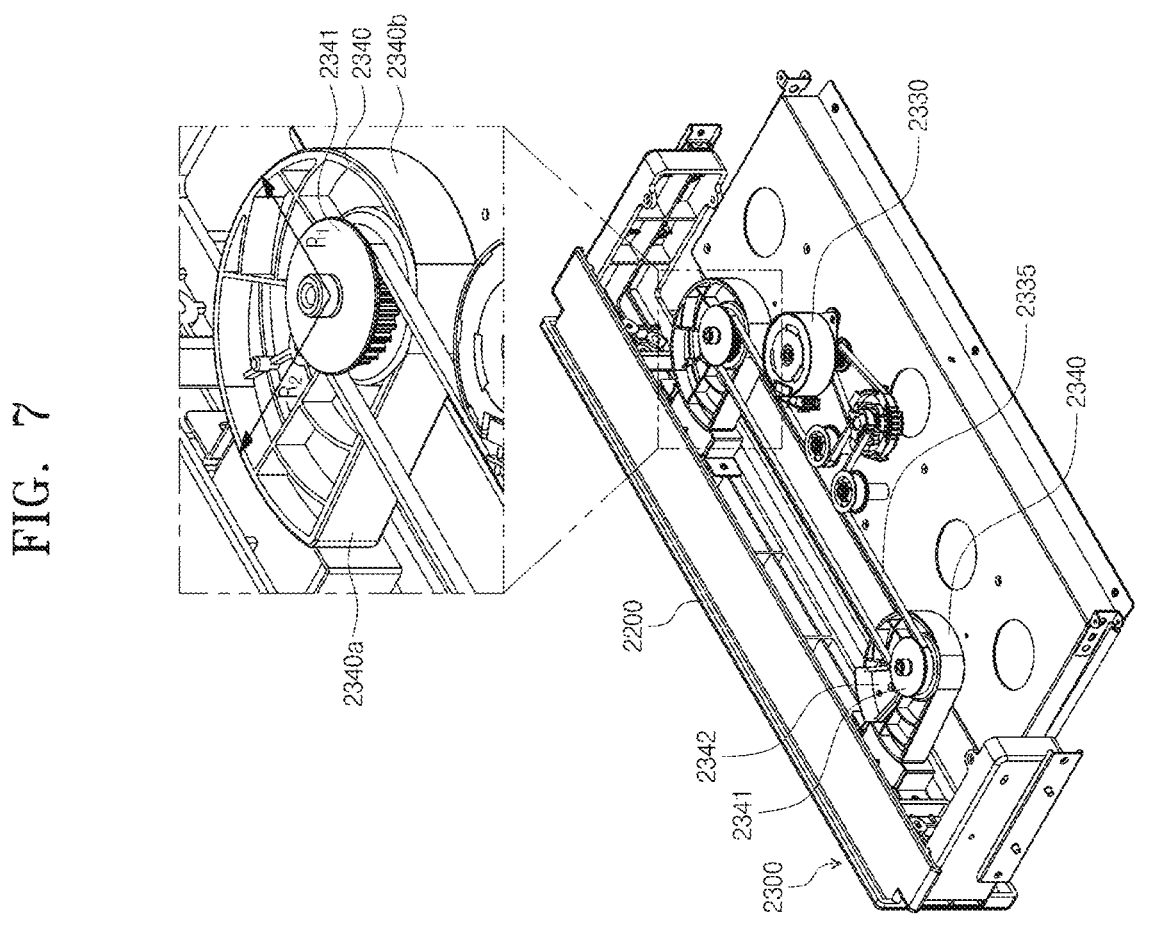

FIG. 6 is a top view illustrating a door driver in a display device according to embodiments. FIG. 7 is a perspective view illustrating a door driver in a display device according to embodiments.

The door driver of FIG. 6 corresponds to the door driver of FIG. 5. A door of FIG. 7 corresponds to the door of FIG. 5. The door driver of FIG. 7 corresponds to the door driver of FIGS. 5 and 6.

Referring to FIGS. 6 and 7, the door driver 2300 may include a plate 2310, a slide unit 2320, a second motor 2330, a cam 2340, and a sensor 2350. The plate 2310 may be rectangular and have the second motor 2330, the cam 2340, and the sensor 2350 mounted thereon. Further, the slide unit 2320 may be located on a side surface of the plate 2310.

The slide unit 2320 may guide the door 2200 to enable the door 2200 to make a linear movement. A detailed description will be given of the slide unit 2320 with reference to FIG. 12.

The second motor 2330 may transmit a driving force to the cam 2340 so that the door 2200 moves. The second motor 2330 may be a stepping motor or a pulse motor.

The cam 2340 may receive a driving force from the second motor 2330 and rotate by the received driving force. In this case, the cam 2340 may include a cam pulley 2341 at a center of rotation, and the cam pulley 2341 may be connected to the second motor 2330 by a second timing belt 2335, thereby transmitting the driving force of the second motor 2330 to the cam 2340.

Referring to FIG. 7, the cam 2340 may include a first surface 2340a formed in a straight line and a second surface 2340b formed in a curved line with a decreasing curvature. In other words, the cam 2340 is not disk-shaped, but rather has a bottom surface which is straight on one side surface thereof and curved on the other side surface thereof. The cam pulley 2341 may be located at a point where first surface 2340a and the second surface 2340b meet.

Because the second surface 2340b is formed in a curve with a decreasing curvature, the cam 2340 may be formed with different radiuses from the cam pulley 2341 serving as the center of rotation to the second surface 2340b. For example, a radius $R_1$ to a portion with a relatively large curvature and a radius $R_2$ to a portion having a relatively small curvature are different, and $R_1$ is less than $R_2$.

Further, the second surface 2340b comes into surface-contact with a portion of the door 2200, and the resulting rotation of the cam 2340 enables linear movement of the door 2200. Further, the cam 2340 rotates in a direction in which the second surface 2340b comes into surface-contact with the door 2200, without rotating in a direction in which the first surface 2340a comes into surface-contact with the door 2200. This will be described in more detail with reference to FIGS. 10 and 11.

The reason that the second surface 2340b of the cam 2340 is formed in a curve with a decreasing curvature rather than a constant curve is that the rotation of the cam 2340 enables linear movement of the door 2200.

That is, for example, when the bottom surface of the cam 2340 is formed in a circle with a constant radius, the door 2200 may not move because of the constant radius, even when the cam 2340 rotates. However, because the cam 2340 of the display device 100 according to embodiments has the second surface 2340b formed in a curve with a decreasing curvature, when the cam 2340 rotates, the radius of the cam 2340 may become smaller or larger without being constant, depending on a direction in which the cam 2340 rotates. Therefore, when the cam 2340 rotates in a direction that decreases the radius, the door 2200 may move in the backward (inward) direction of the housing 2100, whereas when the cam 2340 rotates in a direction increasing the radius, the door 2200 may move in the forward (outward) direction of the housing 2100. The linear movement of the door 2200 according to the rotation of the cam 2340 will be described in more detail with reference to FIGS. 10 and 11.

The door driver 2300 may include the sensor 2350. The sensor 2350 may be a photo interrupter (PI) sensor. The sensor 2350 may or may not encounter a blocker 2342 provided in the cam 2340 depending on a rotational state of the cam 2340, which will be described in more detail with reference to FIG. 8.

Figures 8A, 8B:
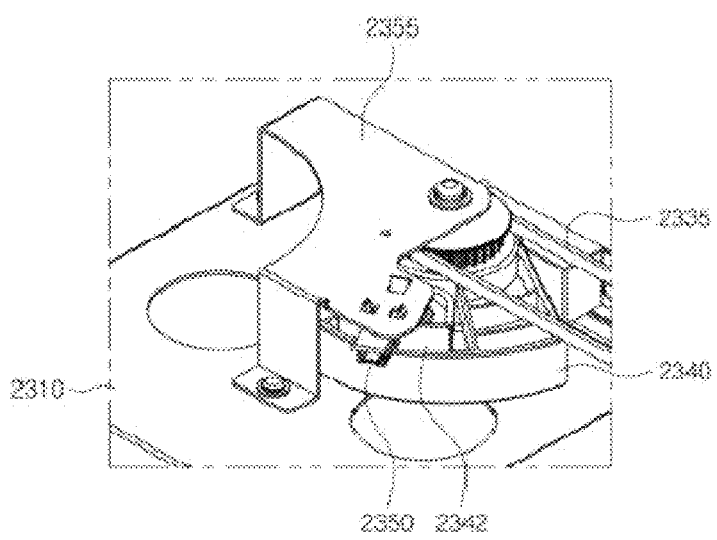
FIG. 8A and FIG. 8B illustrate a cam in a door driver of a display device according to embodiments.

FIG. 8A and FIG. 8B illustrate a cam in a door driver of a display device according to embodiments. More specifically, FIG. 8A illustrates a cam and a sensor, and FIG. 8B illustrates rotational states of the cam.

The cam of FIG. 8A corresponds to the cam illustrated in FIGS. 6 and 7. The sensor of FIG. 8B corresponds to the sensor illustrated in FIGS. 6 and 7.

As illustrated in FIG. 8A, the sensor 2350 is fixed to a second bracket 2355 fixed to the plate 2310. Therefore, the sensor 2350 is fixed in position regardless of the rotation of the cam 2340. The cam pulley 2341 located at the center of rotation of the cam 2340 is fixed to the second bracket 2355. Accordingly, the cam 2340 may rotate with the fixed center of rotation.

Referring to FIGS. 6 to 8B together, the door driver 2300 may include the blocker 2342 which is fixed to the cam 2340 and upon rotation of the cam 2340, rotates together with the cam 2340. Accordingly, because the sensor 2350 is fixed in position on the second bracket 2355 and the blocker 2342 is fixed in position on the cam 2340, the blocker 2342 may pass through the sensor 2350 (a cam 2340-1 in a high saturation state) or may not pass through the sensor 2350 (a cam 2340-2 in a low saturation state) depending on the position of the rotated cam 2340, as illustrated in FIG. 8B.

The blocker 2342 is a cam actuator, and on/off of the sensor 2350 is determined depending on whether the blocker 2342 passes through the sensor 2350, which will be described in more detail with reference to FIG. 9A and FIG. 9B.

FIG. 9A and FIG. 9B illustrate the operating principle of a sensor in a door driver of a display device according to embodiments. More specifically, FIG. 9A illustrates a sensor in an off state, and FIG. 9B illustrates the sensor in an on state.

A cam of FIGS. 9A and 9B corresponds to the cam of FIGS. 8A and 8B, a blocker of FIGS. 9A and 9B corresponds to the blocker of FIGS. 8A and 8B, and the sensor of FIGS. 9A and 9B corresponds to the sensor of FIGS. 8A and 8B.

The sensor 2350 includes a light emitter 2351 that emits light and a light receiver 2352 that receives light from the light emitter 2351. As illustrated in FIG. 9A, when the sensor 2350 does not pass through the blocker 2342, the light receiver 2352 of the sensor 2350 may receive light from the light emitter 2351, thus placing the sensor 2350 in the off state. When the sensor 2350 passes through the blocker 2342 according to rotation of the cam 2340, the light receiver 2352 of the sensor 2350 may not receive light from the light emitter 2351, thus changing the sensor 2350 to the on state.

FIGS. 10A-10F illustrate the principle of opening a door in a display device according to embodiments. FIGS. 11A-11F illustrate the principle of closing a door in a display device according to embodiments.

A housing of FIGS. 10A-10F corresponds to the housing of FIG. 5, the door of FIGS. 10A-10F corresponds to the door of FIG. 7, and a door driver of FIGS. 10A-10F corresponds to the door driver of FIGS. 6 and 7. A housing of FIGS. 11A-11F corresponds to the housing of FIG. 5, the door of FIGS. 11A-11F corresponds to the door of FIG. 7, and the door driver of FIGS. 11A-11F corresponds to the door driver of FIGS. 6 and 7.

Referring first to FIGS. 10A-10F, it illustrates the operating principle of the door driver 2300 when the display 1100 is changed from a retracted state to an extended state. In other words, the display device 100 is illustrated as it changes from the display device 100 of FIG. 2 to the display device 100 of FIG. 3.

As illustrated in FIGS. 10A-10F, with the display 1100 fully retracted, the door 2200 is located exposed to the outside of the housing 1100, and the cam 2340 of the door driver 2300 is positioned with a portion of the second surface 2340b having a smaller curvature in contact with the door 2200, which naturally causes the sensor 2350 not to encounter the blocker 2342, allowing the light receiver 2352 to receive light. Therefore, the sensor 2350 is in the off state (see FIG. 10A).

Figures 10A, 10B, 10C, 10D, 10E, 10F:
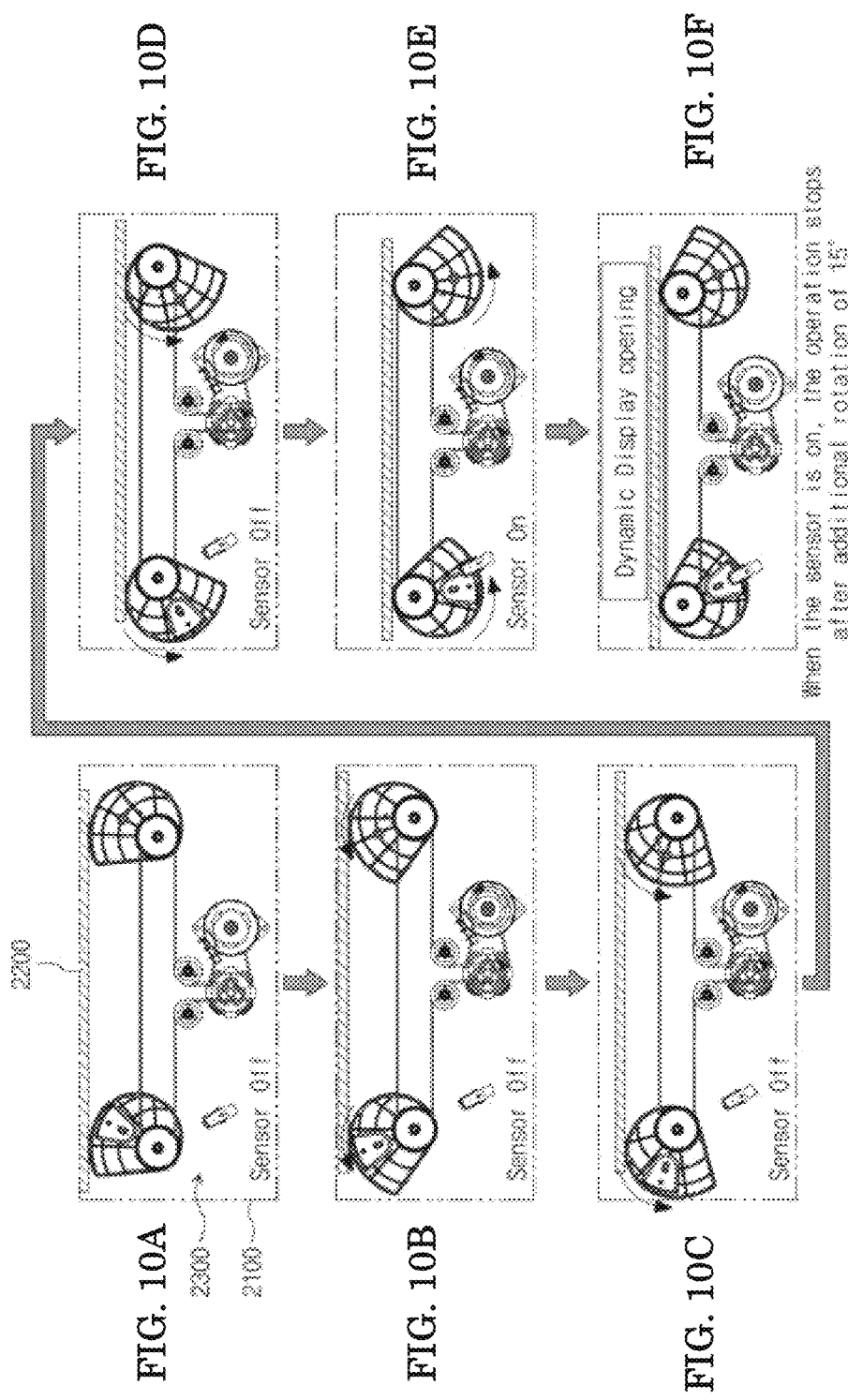
FIGS. 10A-10F illustrate the principle of opening a door in a display device according to embodiments.

To move the door 2200, the second motor 2330 then starts to rotate in a counterclockwise direction, which in turn causes the cam 2340 to start to rotate in the counterclockwise direction (see FIG. 10B).

At this time, the cam 2340 rotates in the direction in which the second surface 2340b comes into contact with the door 2200, as described with reference to FIG. 7. Further, because the cam 2340 is initially positioned such that the portion of the second surface 2340b with a smaller curvature contacts the door 2200, the cam 2340 rotates in the direction in which the curvature of the second surface 2340b gradually increases. Therefore, the portion of the second surface 2340b of the cam 2340 that contacts the door 2200 is changed to a portion with a larger curvature, that is, a curved portion with a smaller radius from the center of rotation (the position of the cam pulley 2341). As a consequence, the door 2200 is able to make a linear movement in the backward (inward) direction of the housing 2100 (see FIGS. 10C and 10D).

When the blocker 2341 fixed to the cam 2340 encounters the sensor 2350 during the counterclockwise rotation of the cam, the light receiver 2352 of the sensor 2350 is unable to receive light, thereby changing the sensor 2350 from the off state to the on state (see FIG. 10E).

Once the sensor 2350 is changed from the off state to the on state, the second motor 2330 stops rotating. At this time, however, the second motor 2330 does not stop rotating immediately. Rather, the second motor 230 stops rotating after the cam 2340 further rotates in the counterclockwise direction by 15° while the sensor 2350 is in the on state (see FIG. 10F).

With the sensor 2350 turned on, the second motor 2330 does not immediately stop rotating, but further operates to position the sensor 2350 at the center of the blocker 2342. Referring to FIG. 8B together, since the angle of the blocker 2342 is 30°, the second motor 2330 stops rotating after the cam 2340 further rotates in the counterclockwise direction by 15°.

In other words, when the sensor 2350 is turned on, the second motor 2330 does not immediately stop rotating. Instead, the second motor 2330 stops rotating after the cam 2340 further operates to position the sensor 2350 at the center of the blocker 2342.

A state in which the second motor 2330 completely stops rotating is a state in which the door 2200 is fully positioned in the backward (inward) direction of the housing 2100, which means that the display 1100 is extendable through the opening of the housing 2100.

As a result, the door 2200 may have a travel length determined by the radius from the center of rotation of the cam 2340 to the second surface 2340b, and a user may adjust the travel length of the door 2200 by adjusting the curvature of the curve forming the second surface 2340b. For example, the radius $R_1$ to the portion with a relatively large curvature may be 34.2 mm, and the radius $R_2$ to the portion with a relatively small curvature may be 51.3 mm (see FIG. 7).

Referring to FIGS. 11A-11F, it illustrates the operating principle of the door driver 2300 when the display 1100 is changed from the extended state to the retracted state. In other words, the display device 100 is illustrated as it changes from the display device 100 of FIG. 3 to the display device 100 of FIG. 2.

As illustrated in FIGS. 11A-11F, with the display 1100 fully extended, the door 2200 is located inside the housing 1100, and the cam 2340 of the door driver 2300 is positioned with a portion of the second surface 2340*b* with a large curvature in contact with the door 2200, which naturally causes the sensor 2350 to meet the blocker 2342, blocking the light receiver 2352 from receiving light. Therefore, the sensor 2350 is in the on state (see FIG. 11A). This state may be identical to the state illustrated in FIG. 10F.

When the display 1100 is fully retracted, the second motor 2330 starts to rotate in a clockwise direction to move the door 2200, which in turn causes the cam 2340 to start to rotate in the clockwise direction. When the blocker 2341 fixed to the cam 2340 no longer passes through the sensor 2350 during the clockwise rotation of the cam 2340, the light receiver 2352 of the sensor 2350 is able to receive light, thereby changing the sensor 2350 from the on state to the off state (see FIG. 11B). In this case, the sensor 2350 is located at the center of the blocker 2342 in the fully extended state of the display 1100. Consequently, when the cam 2340 rotates in the clockwise direction by 15°, the sensor 2350 is placed in the off state.

Because the cam 2340 rotates in the direction in which second surface 2340*b* comes into contact with the door 2200 as described with reference to FIG. 7, and the portion of the second surface 2340*b* having a large curvature is in contact with the door 2200 at an initial position of the cam 2340, the cam 2340 rotates in the direction in which the curvature of the second surface 2340*b* gradually decreases. This causes the portion in contact with the door 2200 to change to the portion of the second surface 2340*b* of the cam, which has a small curvature, that is, a curved portion with a larger radius from the center of rotation (the position of the cam pulley 2341). As a consequence, the door 2200 is able to make a linear movement in the forward (outward) direction of the housing 2100 (see FIG. 11C to FIG. 11E).

Figures 11A, 11B, 11C, 11D, 11E, 11F:
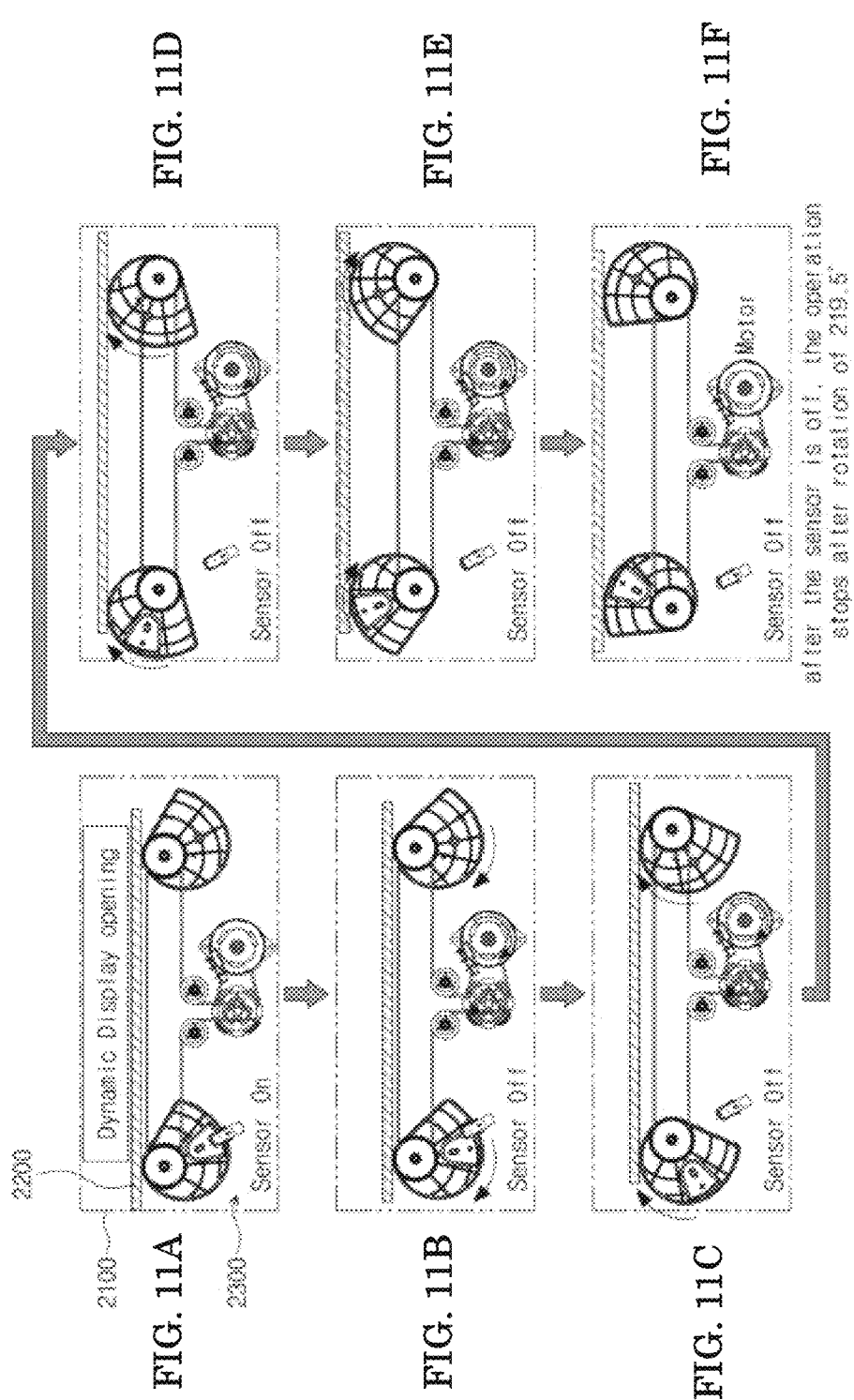
FIGS. 11A-11F illustrate the principle of closing a door in a display device according to embodiments.

After the sensor 2350 is turned off, the second motor 2330 rotates the cam 2340 in the clockwise direction by 219.5° and then stops rotating (see FIG. 11F). Referring to FIG. 8B together, the cam 2340 may be located in the state in which the door 2200 is located inside the housing 2100 (a high saturation state, hereinafter referred to as a "first state") and in the state in which the door 2200 is located outside of the housing 2100, exposed (a low saturation state, hereinafter referred to as a "second state"). When the cam 2340 rotates from the first state to the second state, the cam 2340 rotates such that the first surface 2340*a* may rotate by an angle of 234.5°.

Accordingly, because the sensor 2350 has changed to the off state while the cam 2340 has already rotated in the clockwise direction by 15° in FIG. 10B, the cam 2340 only needs to rotate in the clockwise direction by an additional angle of 219.5° after the sensor 2350 is turned off, to change to the second state.

In other words, with the sensor 2350 turned off, the second motor 2330 stops rotating after the cam 2340 rotates by 219.5° in the clockwise direction. A state in which the second motor 2330 stops rotating is a state in which the door 2200 is fully located in the forward (outward) direction of the housing 2100, which means that the opening of the housing 2100 is closed by the door 2200.

Figure 12:
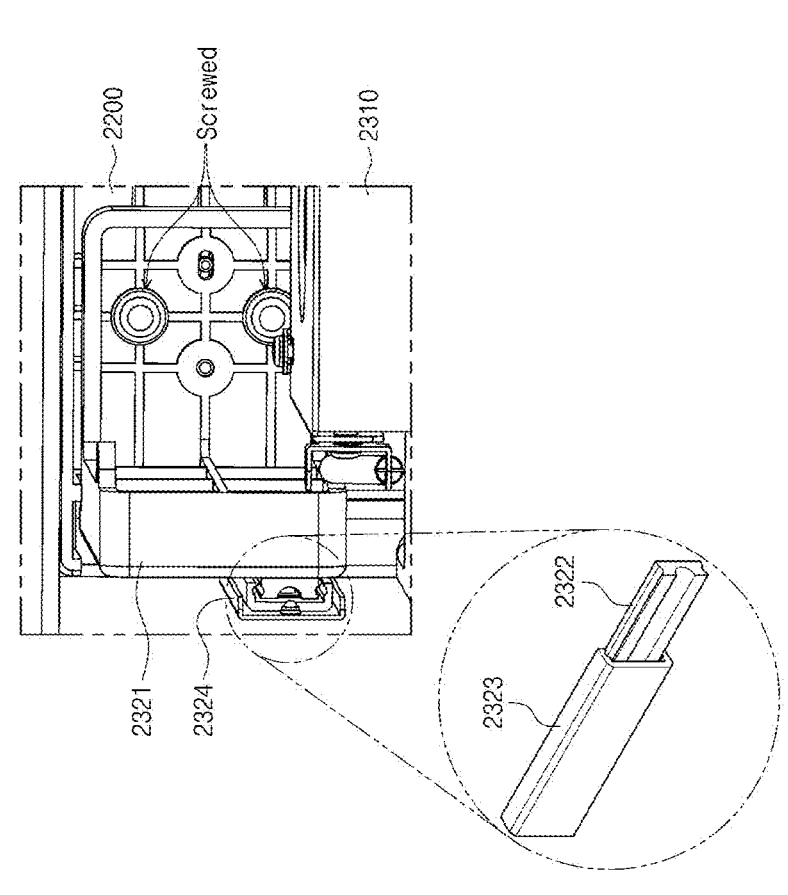
FIG. 12 illustrates a slide unit in a display device according to embodiments.

FIG. 12 illustrates a slide unit in a display device according to embodiments.

The slide unit of FIG. 12 corresponds to the slide unit of FIG. 6.

Referring to FIG. 12, the slide unit 2320 may include a connection fixture 2321, a first slide 2322, a first bracket 2324, and a second slide 2323.

The connection fixture 2321 may be fixedly connected to the door 2200 and move together with the door 2200 when the door 2200 moves. The connection fixture 2321 may be screwed to the door 2200. The first slide 2322 is fixed to the connection fixture 2321. More specifically, the connection fixture 2321 may be shaped like "7" where first and second parts meet at a right angle and where the first part may be fixedly connected to the door 2200 and the second part may be fixedly connected to the first slide 2322.

The first bracket 2324 may be fixedly connected to the housing 2100 and kept fixed regardless of movement of the door 2200. The first bracket 2324 may be screwed to the housing 2100. The second slide 2323 is fixed to the first bracket 2324. More specifically, the first bracket 2324 may be rail-shaped, and the second slide 2323 may be fixedly connected to the interior of the rail-shaped first bracket 2324.

The first slide 2322 is connected to be slidable inside the second slide 2323. Thus, in the case where the door 2200 makes a linear movement by rotation of the cam 2340, the connection fixture 2321 that linearly moves with the door 2200, and the first slide 2322 fixedly connected to the connection fixture 2321 slide inside the second slide 2323, which enables the linear movement of the door 2200. Further, the first bracket 2324 fixed to the housing 2100 and the second slide 2323 fixedly connected to the first bracket 2324 do not move in spite of the movement of the door 2200, thereby enabling the door 2200 to move for a predetermined travel length without deviating.

Figure 13:
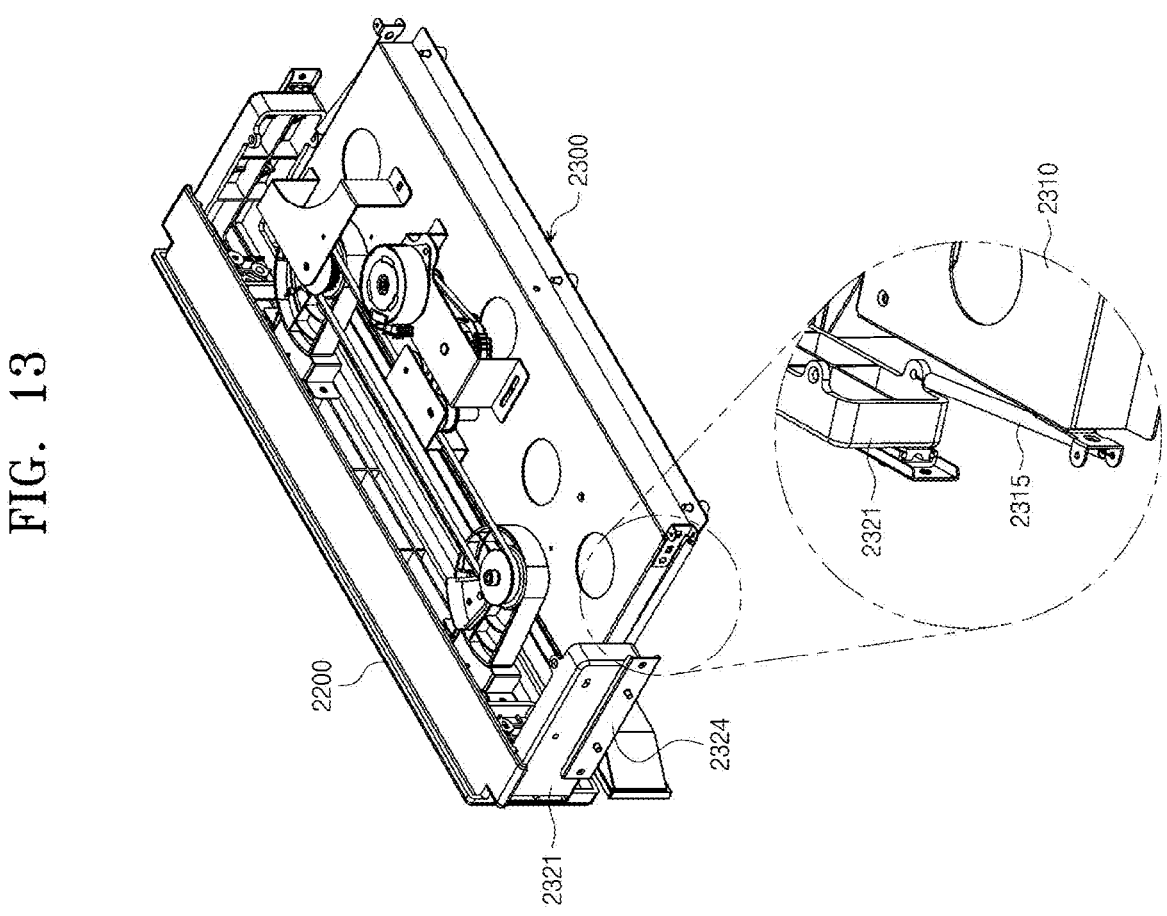
FIG. 13 illustrates the operating principle of a spring in a door driver of a display device according to embodiments.
Figure 14A:
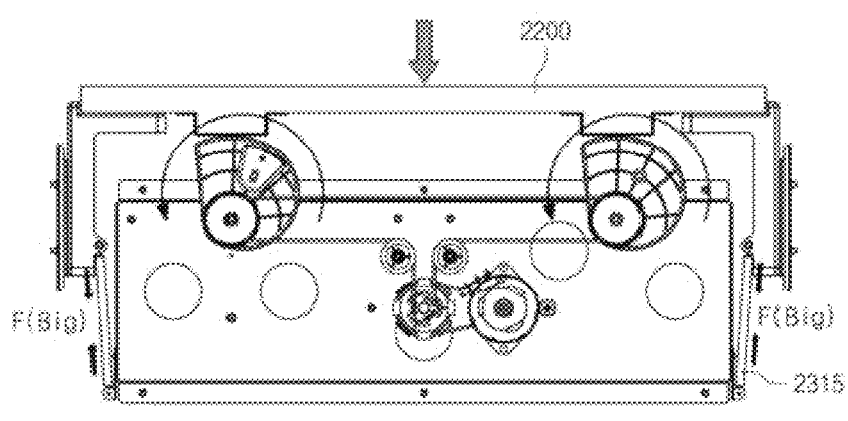
FIGS. 14A and 14B illustrate the operating principle of a spring in a display device according to embodiments.
Figure 14B:
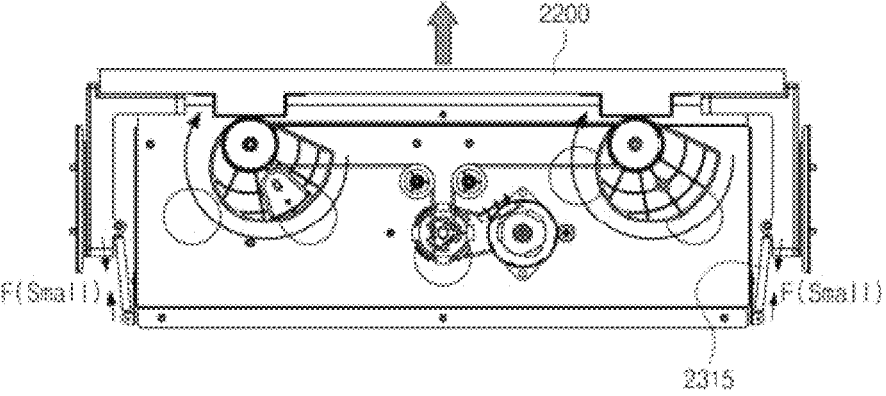

FIG. 13 illustrates a spring in a door driver of a display device according to embodiments. FIGS. 14A and 14B illustrate the operating principle of a spring in a display device according to embodiments. More specifically, FIG. 14A illustrates a state in which a door is located in the outside of a housing, and FIG. 14B illustrates a state in which the door is located inside the housing.

The door driver of FIG. 13 corresponds to the door driver of FIGS. 6 and 7. A door driver of FIGS. 14A and 14B corresponds to the door driver of FIG. 13.

Referring to FIG. 13, the door driver 2300 may include a spring 2315 that provides an elastic force in a direction of movement of the door 2200. More specifically, the spring 2315 may have one end connected to the connection fixture 2321 and the other end connected to the plate 2310. As illustrated in FIG. 12, the connection fixture 2321 may be in the shape of "7" where the first part and the second part meeting at a right angle, and the spring 2315 may be fixedly connected to the second part fixedly connected to the first slide 2322.

With reference to FIGS. 14A and 14B, the operating principle of the spring 2315 will be described in more detail.

As illustrated in FIG. 14A, when the door 2200 is located in the outside of the housing 2100 and is to move inward, the spring 2315 pulls the door 2200 through the connection fixture 2321 and consequently into the housing 2100, thus enabling the door 2200 to make a linear movement by rotation of the cam 2340.

Further, as illustrated in FIG. 14B, when the door 2200 is located inside the housing 2100 and is to move outward, the cam 2340 is capable of rotating while overcoming the elastic force of the spring 2315 in view of the driving force of the second motor 2330, and as a result, the rotation of the cam 2340 enables the door 2200 to make a linear movement. That is, the driving force provided by the second motor 2330 overcomes the elastic force of the spring 2315.

Figure 15:
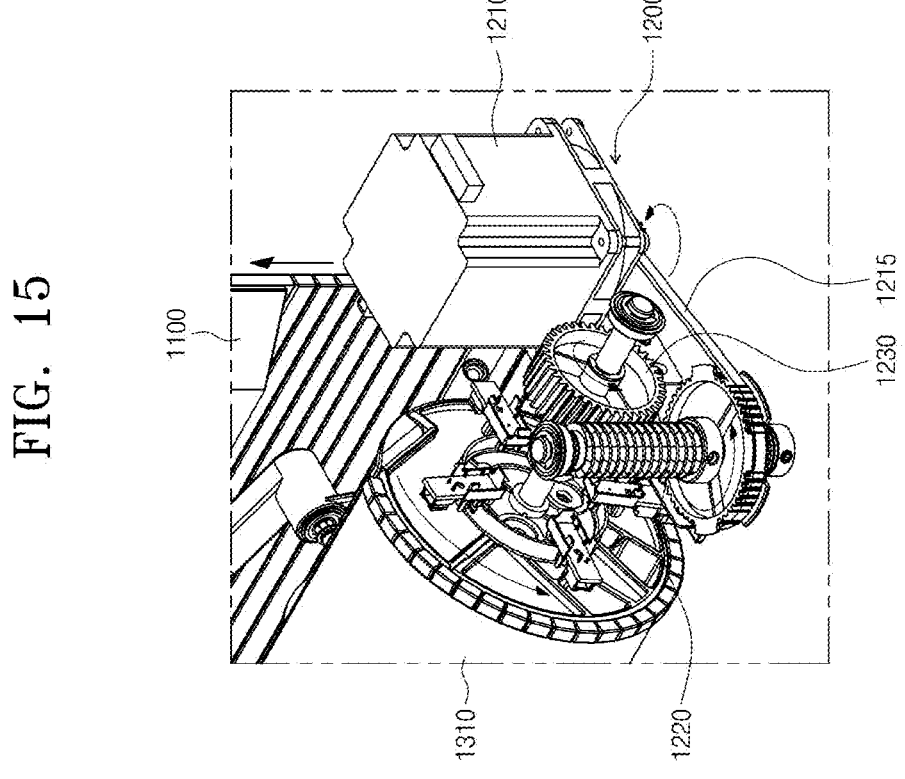
FIG. 15 illustrates a display driver in a display device according to embodiments.

FIG. 15 illustrates a display driver in a display device according to embodiments.

The display driver of FIG. 15 corresponds to the display driver illustrated in FIG. 4.

Referring to FIG. 15, the display driver 1200 may include a first motor 1210, a first timing belt 1215, a worm gear unit 1220, and a worm wheel unit 1230. In addition, the display winder 1300 may include a cylindrical rotation drum 1310 that may rotate around a horizontal rotation axis and wind the display 1100 around an outer circumferential surface thereof.

The first motor 1210 provides power to move the display winder 1300. The first motor 1210 may be connected to the rotation drum 1310 to rotate the rotation drum 1310. Various gear components may be used to connect the first motor 1210 and the rotation drum 1310.

As illustrated in FIG. 15, the first timing belt 1215 is connected to a rotation axis of the first motor 1210, and the worm gear unit 1220 is connected to the first timing belt 1215 to rotate. The worm wheel unit 1230 rotates in mesh with the worm gear unit 1220, and is connected to a rotation axis of the rotation drum 1310 to transmit the power of the first motor 1210 to the rotation drum 1310. When the rotation drum 1310 rotates by the first motor 1210, the display 1100 is wound around or unwound from the rotation drum 1310 depending on the direction of the rotation, thereby controlling an extension range of the display 1100.

The rotation of the first motor 1210 may be controlled by a controller (not shown). For example, the controller (not shown) may control the operation of the first motor 1210 for proper retraction or extension of the display 1100. The display unit 1100 may have a different size of area extended to the outside depending on a mode, and the first motor 1210 may control its operation depending on a mode selected by the user to adjust an exposure range of the display 1100. The first motor 1210 may be a stepping motor or a hybrid motor. The controller (not shown) may represent an integrated controller or head unit of a vehicle. Alternatively, the controller (not shown) may be configured in software, in hardware, as a processor, or in a combination thereof that controls the display device.

The worm gear unit 1220 includes a rod rotating around a rotation axis parallel to the rotation axis of the first motor 1210 and a worm gear connected to the rod. The worm gear unit 1220 may rotate by the rotation of the first motor 1210, and operatively connected to the first motor 1210 by the first timing belt 1215. That is, the first motor 1210 may rotate the rod of the worm gear unit 1220 by the first timing belt 1215.

The worm wheel unit 1230 is connected to the worm gear unit 1220 and includes a worm wheel gear with a rotation axis perpendicular to the rotation axis of the first motor 1210 or the worm gear unit 1220. As illustrated in FIG. 15, the rotation axis of the worm wheel unit 1230 is the same as the rotation axis of the rotation drum 1310. Thus, when the worm wheel unit 1230 rotates by the rotation of the first motor 1210, the rotation drum 1310 rotates.

The material of the worm wheel gear may include polyoxymethylene (POM), and the material of the worm gear may include brass.

Figures 16A, 16B, 16C:
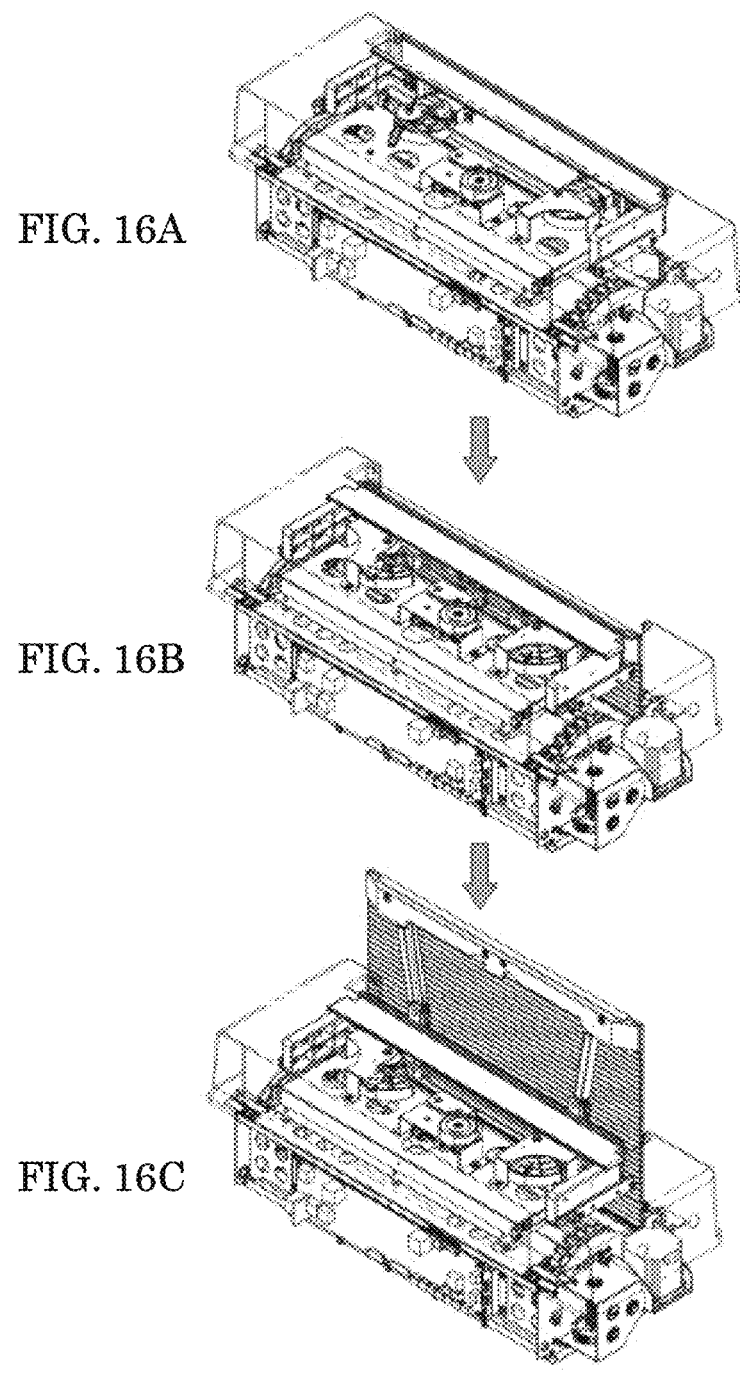
FIGS. 16A-16C illustrate a process of extending a display in a display device according to embodiments.

FIGS. 16A-16C illustrate a process of extending a display in a display device according to embodiments. More specifically, FIG. 16A illustrates a state in which a door is located in the outside of a housing, FIG. 16B illustrates a state in which the door is located inside the housing, and FIG. 16C illustrates a state in which the display is extended with the door located inside the housing.

The display device of FIGS. 16A-16C corresponds to the display device of FIGS. 2 and 3. The display driver of FIGS. 16A-16C corresponds to the display driver of FIG. 15. The housing of FIG. 16 corresponds to the housing of FIG. 5. The door of FIGS. 16A-16C corresponds to the door of FIG. 5. A door driver of FIGS. 16A-16C corresponds to the door driver of FIGS. 5 to 7.

Referring to FIGS. 16A-16C, the operating principle of the display device 100 according to embodiments will be described.

As described with reference to FIG. 10, when the display 1100 is fully retracted, the door 2200 is located in the outside of the housing 2100. That is, the opening through which the display 1100 is extendable or retractable may be closed by the door 2200 (see in FIG. 16A).

When the display 1100 in the fully retracted state is extended by the user, the door driver 2300 is driven before the display driver 1200 is driven to extend the display 1100. In other words, before the display 1100 is extended, the door driver 2300 moves the door 2200 in the inward direction of the housing 2100 (see FIG. 16B). The principle of moving the door 2200 has been described with reference to FIG. 10.

When the door 2200 is fully moved in the inward direction of the housing 2100, the display driver 1200 drives the display 1100 in an extension direction (see FIG. 16C). The operating principle of driving the display 1100 has been described with reference to FIG. 15.

FIGS. 16A to 16C in this order illustrate the change of the display 1100 from the retracted state to the extended state, and in the reverse order, illustrate the change of the display 1100 from the extended state to the retracted state.

Accordingly, when the display 1100 is changed from the extended state to the retracted state, the display 1100 is first fully retracted by the display driver 1300 (see FIG. 16B), and then the door driver 2300 moves the door 2200 in the outward direction of the housing 2100 (see FIG. 16A).

Figure 17:
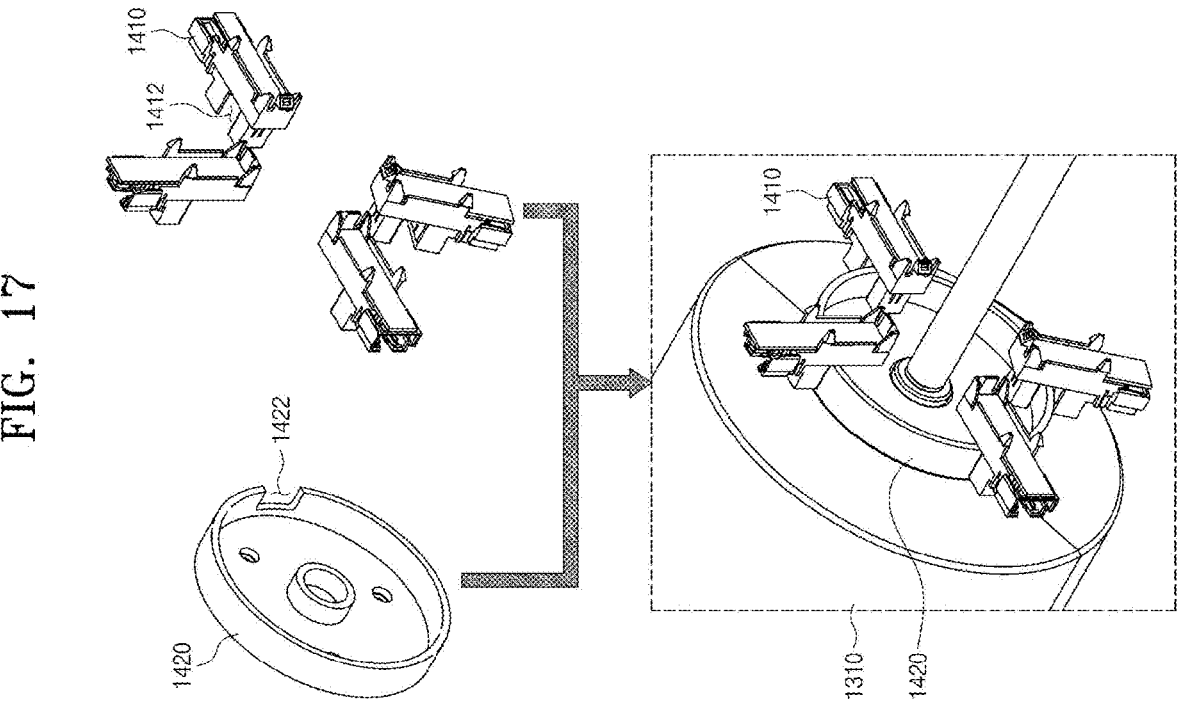
FIG. 17 illustrates the principle of controlling exposure of a display according to rotation of a display winder in a display device according to the embodiments.

FIG. 17 illustrates the principle of controlling exposure of a display based on rotation of a display winder in a display device according to embodiments.

The display winder of FIG. 17 corresponds to the display winder of FIGS. 4 and 15.

Referring to FIG. 17, the display unit 1000 may include a plurality of sensors 1410 and a sensed portion 1420 sensed by the plurality of sensors 1410. The sensed portion 1420 may be connected to one surface of the rotation drum 1310 to rotate together with the rotation drum, and may be sensed by at least one of the plurality of sensors 1410. The sensors 1410 may be fixed in position to a frame located within a casing. The side surface of the rotation drum 1310 to which the sensed portion 1420 is connected represents a surface perpendicular to the rotation axis of the rotation drum 1310.

Depending on rotation states of the rotation drum 1310, the sensing states of the plurality of sensors 1410 may vary, and the operation of the first motor 1210 may be controlled based on the sensing states of the plurality of sensors 1410. In other words, any one of the plurality of sensors 1410 may sense a state different from a state sensed by the other sensors based on a rotation state of the rotation drum 1310, and the operation of the first motor 1210 may be controlled accordingly. Therefore, the display device 100 according to an embodiment may control the extension range of the display 1100 by recognizing the rotation of the display winder 1300 through the plurality of sensors 1410 and the sensed portion 1420.

The plurality of sensors 1410 are fixed at positions where they may sense the rotation of the rotation drum 1310. The plurality of sensors 1410 may be fixed within the casing to sense the sensed portion 1420 connected to the rotation drum 1310. Accordingly, the sensors 1410 are maintained at certain positions without rotating together with the rotation drum 1310.

The sensed portion 1420 rotates in connection to the rotation drum 1310, and the sensed portion 1420 is shaped such that one of the plurality of sensors 1410 senses differently from the other sensors. For example, in the case where the plurality of sensors 1410 include a first sensor 1410a, a second sensor 1410b, a third sensor 1410c, and a fourth sensor 1410d, when the first sensor 1410a is in an on state by the sensed portion 1420, the second sensor 1410b to the fourth sensor 1410d are in an off state. On the contrary, the first sensor 1410a may be in the off state, while the second sensor 1410b to the fourth sensor 1410d may be in the on state.

The sensed portion 1420 is connected to one surface of the rotation drum 1310 and includes a hole 1422 that the sensors 1410 may sense.

When the rotation drum 1310 rotates, the position of the hole 1422 also rotates around the rotation axis, and when the hole 1422 pass through a sensing area 1412 of any one of the sensors 1410, the sensor may detect a rotation state of the rotation drum 1310 by sensing the hole 1422. Accordingly, the extension range of the display 1100 may be controlled by mapping rotation states of the rotation drum 1310 to a plurality of modes.

Figures 18A, 18B:
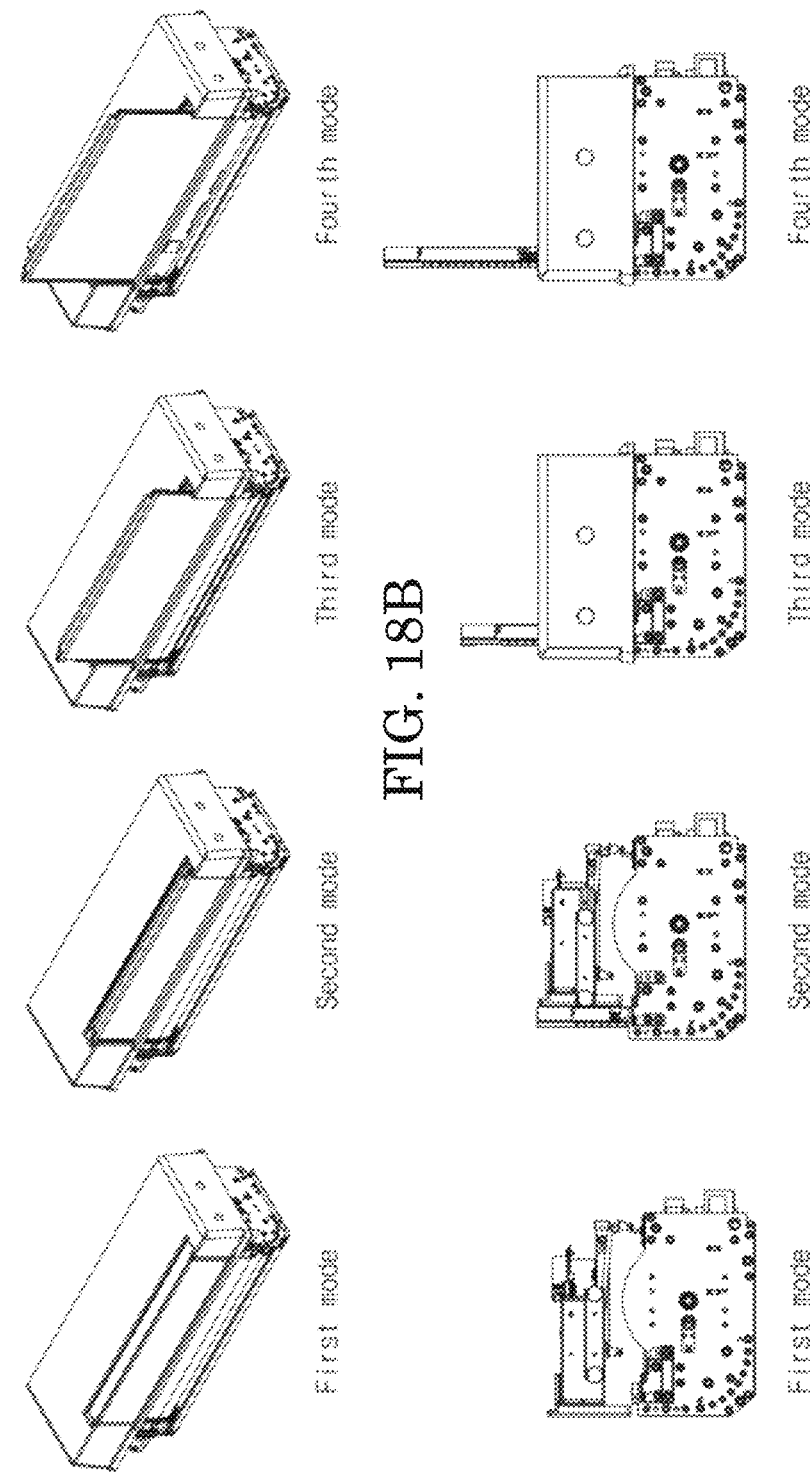
FIGS. 18A and 18B illustrate modes based on exposure of a display in a display device according to embodiments.

FIGS. 18A-18B illustrates modes based on exposure of a display in a display device according to embodiments. More specifically, FIG. 18A is a perspective view illustrating the display device, and FIG. 18B is a side view illustrating the display device.

The display device of FIGS. 18A and 18B corresponds to the display device of FIGS. 2 and 3.

Referring to FIGS. 18A and 18B, the display 1100 is extended to different ranges in four modes. Although four modes are shown, there may be more or fewer modes. The modes may be categorized into four modes including a first mode in which the display 1100 is fully retracted and a fourth mode in which the display 1100 is fully extended. Each mode may be identified by the type and function of information displayed on the display 1100. For example, a third mode may be used for a navigation screen, and the fourth mode may be used for running a video or a game.

In the first mode, the display 1100 is retracted into the casing, with as much of the display 1100 as possible wound around the rotation drum 1310. In addition, the door 2200 is located in the outside of the housing 2100 in the first mode.

When one of the second through fourth modes is executed by user selection, the door driver 2300 may first move the door 2200 in the inward direction of the housing 2100. Then, when it is determined that the door 2200 has been fully moved in the inward direction of the housing 2100, the display driver 1200 may operate the first motor 1210 to rotate the rotation drum 1310 and extend the display 1100 outward from the housing 2100.

On the contrary, when the first mode is executed by user selection in one of the second to fourth modes, the display driver 1200 may first operate the first motor 1210 to rotate the rotation drum 1310 and retract the display 1100 into the housing 2100. Then, when it is determined that the display 1100 has been fully retracted, the door driver 2300 may move the door 2200 outward from the housing 2100.

That is, unlike the display driver 1200, the door driver 2300 is characterized as being operative to start the first mode or return to the first mode.

In addition, the display device 100 according to embodiments may further include a controller (not shown).

When a user-desired mode (hereinafter, referred to as a "target mode") is the same as a mode currently running (hereinafter, referred to as a "current mode"), the controller may control to stop retraction/extension of the display 1100, that is, to maintain the display 1100 in its current state. On the contrary, when the target mode is not the same as the current mode, the controller may control the display driver 1200 to operate the first motor 1210 to retract or extend the display 1100. The controller may also control whether to operate the door driver 2300.

For example, when the target mode is the second mode, the controller determines which mode the current mode corresponds to. When the controller determines that the current mode corresponds to the first mode, it may control the door driver 2300 to move the door 2200 in the inward direction of the housing 2100 before controlling the display driver 1200. When the controller determines that the door 2200 has been fully moved in the inward direction of the housing 2100, the controller may control the first motor 1210 to operate in a first direction (e.g., clockwise). Further, when the controller determines that the current mode corresponds to the third mode or the fourth mode, the controller may control only the first motor 1210 to operate in a second direction (e.g., counterclockwise) without controlling the door driver 2300. Preferably, the second direction is the opposite of the first direction.

For example, when the target mode is the third mode, the controller determines which mode the current mode corresponds to. When the controller determines that the current mode corresponds to the first mode, the controller may first control the door driver 2300 to move the door 2200 in the inward direction of the housing 2100. Then, when the controller determines that the door 2200 has been fully moved in the inward direction of the housing 2100, the controller may control the first motor 1210 to operate in the first direction (e.g., clockwise). Alternatively, when the controller determines that the current mode corresponds to the second mode, the controller may control only the first motor 1210 to operate in the first direction (e.g., clockwise) without controlling the door driver 2300. Likewise, when the controller determines that the current mode corresponds to the fourth mode, the controller may control only the first motor 1210 to operate in the second direction (e.g., counterclockwise).

For example, when the target mode is the fourth mode, the controller determines which mode the current mode corresponds to. When the controller determines that the current mode corresponds to the first mode, the controller may first control the door driver 2300 to move the door 2200 in the inward direction of the housing 2100. Then, when the control determines that the door 2200 has been fully moved in the inward direction of the housing 2100, the controller may control the first motor 1210 to operate in the first direction (e.g., clockwise). Alternatively, when the controller determines that the current mode corresponds to the second mode or the third mode, the controller may control only the first motor 1210 to move in the first direction (e.g., clockwise) without controlling the door driver 2300.

Further, when the target mode is the first mode, the controller determines which mode the current mode corresponds to. When the controller determines that the current mode corresponds to the second, third, or fourth mode, the controller may control the first motor 1210 to operate in the second direction (e.g., counterclockwise), and when the controller determines that the display 1100 has been fully retracted, the controller may control the door driver 2300 to move the door 2200 in the outward direction of the housing 2100.

According to any one of embodiments of the disclosure, the utilization of the internal space of a vehicle is increased by reducing an accommodation space for a display.

Furthermore, according to any one of embodiments of the disclosure, the utilization of the display is increased by adjusting the degree of exposure of the display, and power may be saved by using power only for an exposed portion of a display area.

Furthermore, according to any one of the embodiments of the disclosure, a flexible display may be retracted or extended from the accommodation space, while being protected safely.

As described above, a detailed description of preferred embodiments of the disclosure has been given to enable those skilled in the art to implement and practice the disclosure. While the above description has been made with reference to the preferred embodiments of the disclosure, it will be understood by those skilled in the art that various modifications and changes may be made to the disclosure without departing from the scope of the disclosure. For example, those skilled in the art may use the configurations described in the above-described embodiments in combination with each other.

Accordingly, the embodiments as set forth herein are not intended to limit the disclosure, but rather to give the broadest possible scope consistent with the principles and novel features disclosed herein.

What is claimed is:

1. A display device comprising:
a display driver configured to move a display;
a display winder configured to wind and unwind the display according to the movement of the display; and
a display support unit configured to support the display,
wherein the display support unit includes:
a housing configured to support the display;
a door provided in the housing and configured to be movable to enable the display to move into and out of the housing; and
a door driver configured to move the door, wherein the door driver includes:
a second motor configured to provide a driving force; and
a cam configured to receive the driving force and be rotatable by the driving force, and
wherein the door is linearly movable by rotation of the cam,
a blocker fixed to the cam and upon the rotation of the cam, configured to rotate together with the cam; and
a sensor including a light emitter configured to emit light and a light receiver configured to receive the light, and
wherein on/off of the sensor is determined according to whether the light is blocked by the blocker,
the cam includes a cam pulley connected to the second motor by a second timing belt and being a rotation axis of the cam,
wherein the cam includes a first surface formed in a straight line and a second surface formed in a curve with a decreasing curvature, and
wherein the cam pulley is formed at a position where the first surface and the second surface meet.

2. The display device of claim 1, wherein the door is in surface-contact with the second surface of the cam.

3. The display device of claim 1, wherein the door driver includes a slide unit to enable the door to move, and
wherein the slide unit includes:
a connection fixture configured to fix the door thereto and moving together with the door;
a first slide fixed to the connection fixture;
a first bracket fixed to the housing; and
a second slide fixed to the first bracket and configured to allow the first slide to be movable therein.

4. The display device of claim 1, wherein the door driver includes a spring providing an elastic force in a direction of movement of the door.

5. The display device of claim 1, wherein the display driver includes:
a first motor providing a driving force;
a worm gear unit connected to the first motor and configured to have a rotation axis parallel to the first motor; and
a worm wheel unit connected to the worm gear unit and configured to have a rotation axis perpendicular to the first motor, and
wherein the display winder includes a cylindrical rotation drum rotating around a horizontal rotation axis and capable of winding the display around an outer circumferential surface thereof, and
wherein the rotation axis of the worm wheel unit is the same as the rotation axis of the cylindrical rotation drum to move the display by rotation of the first motor.

6. A vehicle comprising:
a vehicle body; and
a display device provided in the vehicle body,
wherein the display device includes:
a display driver configured to move a display;
a display winder configured to wind and unwind the display according to the movement of the display; and
a display support unit configured to support the display, and
wherein the display support unit includes:
a housing configured to support the display;
a door provided in the housing and configured to be movable to enable the display to move into and out of the housing; and
a door driver moving the door, wherein the door driver includes:
a second motor configured to provide a driving force; and
a cam configured to receive the driving force and be rotatable by the driving force, and
wherein the door is linearly movable by rotation of the cam,
a blocker fixed to the cam and upon the rotation of the cam, configured to rotate together with the cam; and
a sensor including a light emitter configured to emit light and a light receiver configured to receive the light, and
wherein on/off of the sensor is determined according to whether the light is blocked by the blocker,
the cam includes a cam pulley connected to the second motor by a second timing belt and being a rotation axis of the cam,
wherein the cam includes a first surface formed in a straight line and a second surface formed in a curve with a decreasing curvature, and
wherein the cam pulley is formed at a position where the first surface and the second surface meet.

7. The vehicle of claim 6, wherein the housing is an instrument panel (IP) of the vehicle body.

* * * * *